May 25, 1965  J. W. SMITH ET AL  3,185,912
RECORDER POWER SUPPLY
Filed Dec. 16, 1960  2 Sheets-Sheet 2

INVENTORS
John W. Smith
Donald F. Cleary
by Edward V. Connors
ATTORNEY

United States Patent Office 3,185,912
Patented May 25, 1965

3,185,912
RECORDER POWER SUPPLY
John W. Smith, Whitestone, and Donald F. Cleary, West Islip, N.Y., assignors to Hogan Faxmile Corporation, New York, N.Y.
Filed Dec. 16, 1960, Ser. No. 76,299
3 Claims. (Cl. 321—18)

The present invention relates to a voltage regulated rectified direct current power supply apparatus, and more particularly to such a power supply including silicon controlled rectifiers and means for effecting control of the firing angle of the rectifiers.

A controlled power supply in accordance with the invention is particularly suitable for use with high speed electrolytic recorders in which the direct current demands may vary from zero to maximum and again to zero within a small fraction of a second.

An object of the invention is the provision of an improved arrangement for providing a controlled direct current output for a load supplied by controlled rectifiers from an alternating current source and in which the output voltage is maintained within narrow limits irrespective of large variations in the load.

In accordance with the invention the load voltage adjustment is achieved by comparing a sensing voltage developed from the load voltage with a sawtooth voltage to determine a firing point for controlled rectifiers. Means are provided so that a steep edged pulse actuates the rectifiers.

The construction in accordance with the invention is advantageous in that an adjustment of the load voltage may be made in a short time ranging from a very small fraction to a large fraction of a half cycle, depending upon the portion of the cycle when the necessity for correction arises.

Other objects and advantages of the invention will be apparent from the following description and from the accompanying drawings which show, by way of example, an embodiment of the invention.

Figure 1:
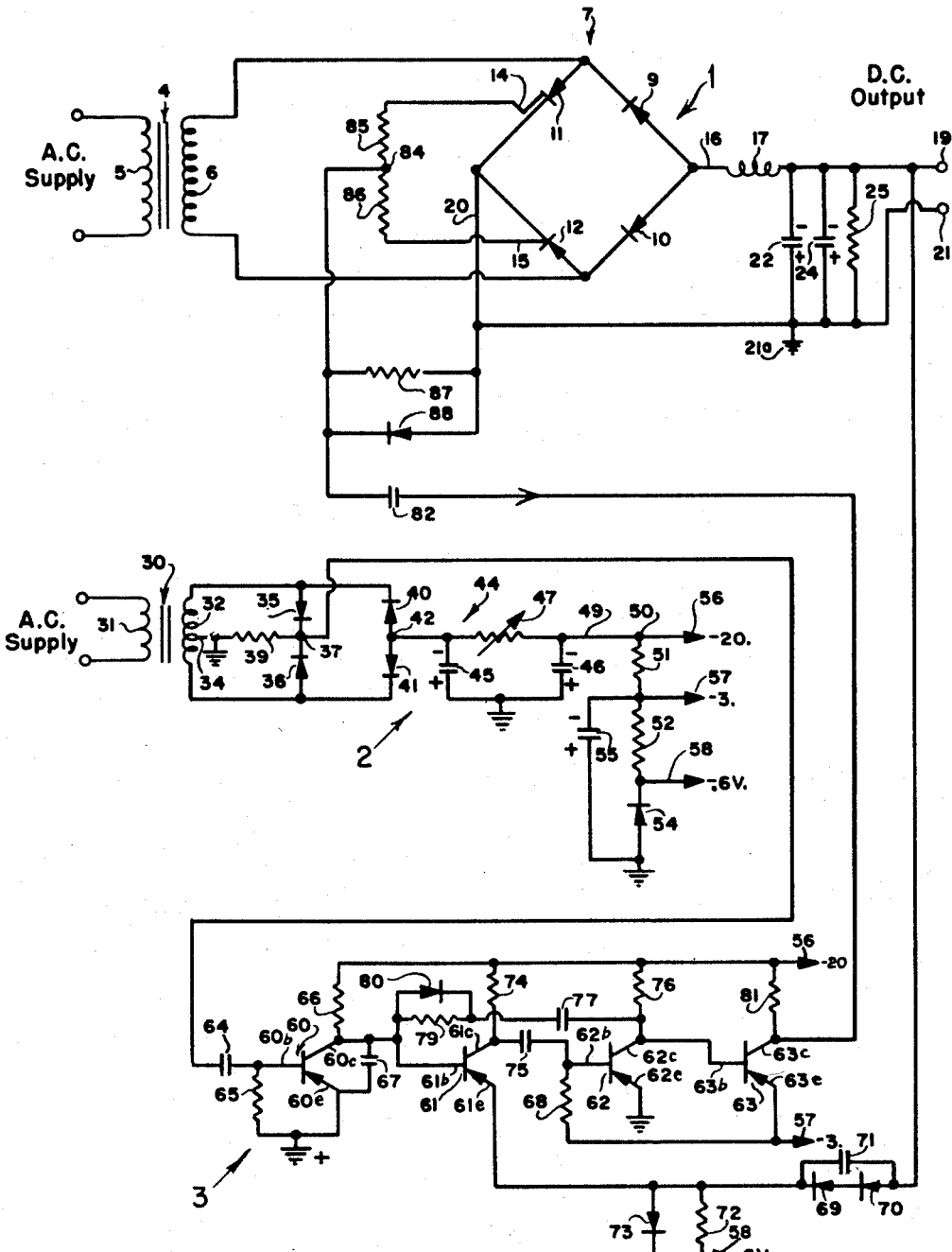
FIGURE 1 is a schematic wiring diagram of a power supply in accordance with the invention.

Referring to the drawing there is shown in FIGURE 1 a power supply in accordance with the invention and including a main power supply unit 1, a control unit power supply 2, and a control unit 3.

The main power supply unit 1 may include a transformer 4 having a primary winding 5 and a secondary winding 6. The transformer 4 is adapted to be connected to a suitable alternating current source. Across the secondary winding 6 is connected a rectifier bridge 7 including rectifier units 9 and 10, preferably of the solid state type, and controlled rectifiers 11 and 12, preferably of the silicon controlled type, which conduct when potential is applied to their control or gate electrodes 14 and 15. Negative output 16 of the rectifier bridge 7 is connected through a filtering choke to negative output terminal 19. Positive output 20 of the rectifier bridge 7 is grounded as indicated at 21a and connected to positive output terminal 21. After the choke 17 and across the outputs 16 and 20 are connected filtering condensers 22 and 24, and a bleeder resistor 25.

The control unit power supply unit 2 provides positive full wave unfiltered direct current and negative full wave filtered direct current for the control unit 3, and may include a transformer 30 adapted to be connected to a suitable alternating current source, and having a primary winding 31 and a secondary winding 32. The secondary winding 32 has its midpoint 34 grounded and across its terminals are connected rectifiers 35 and 36 in a full wave rectifying connection, the midpoint 37 between the rectifiers 36 and 37 being connected through a load resistor 39 with the secondary winding midpoint 34. The output of the rectifiers 35 and 36 is a source of positive unfiltered direct current. Also connected across the terminals of the secondary winding 32 are rectifiers 40 and 41 in a full wave rectifying connection, midpoint 42 being connected through a filter 44 including capacitors 45 and 46 and a resistor 47. Output 49 of filter 44 is connected to a voltage divider 50 including resistors 51 and 52 connected in series with a diode 54 to ground. A capacitor 55 is connected across the resistor 52 and the diode 54 to ground to provide additional filtering. Outputs 56, 57, and 58 respectively provide filtered negative direct current potentials of −20, −3, and −0.6 volts respectively.

The control unit 3 is adapted to provide a series of control pulses for the gates 14 and 15 of the controlled rectifiers 11 and 12. The control unit 3 includes a transistor 60 adapted to produce a plurality of saw tooth pulses, a transistor 61 adapted to compare the saw tooth pulses with a direct current sensing voltage connected to output 19, a transistor 62 in combination with transistor 61 provides a one shot trigger action which sharpens the pulse rise of the output of transistor 61, and a transistor 63 adapted to amplify the signal. Each of the transistors 60, 61, 62, and 63 have emitters, bases, and collectors respectively identified as 60e, 60b, and 60c, etc.

The unfiltered positive direct current from midpoint 37 is connected in series through a capacitor 64 and a resistor 65 to ground in a clamping circuit which has the effect of producing a pulse across the resistor 65 having negative spikes which are applied across the base-emitter of transistor 60.

Transistor 60 has its base 60b connected to resistor 65, its emitter 60e grounded, and its collector 60c connected through a resistor 66 to the negative supply 56. A capacitor 67 is connected across emitter 60e and collector 60c. Collector 60c is connected to base 61b of transistor 61. Its emitter 61e is connected to a voltage sensing circuit including a pair of zener diodes 69 and 70 connected in series, with a capacitor 71 connected thereacross. The zener diodes 69 and 70 are connected to the load negative 19. A resistor 72 and a diode 73 are connected in parallel between emitter 61e and negative supply 58. Collector 61c is connected through a resistor 74 to the negative supply 56 and through a coupling capacitor 75 to base 62b of transistor 62. The base 62b is negatively biased through resistor 68 connected to the negative supply 57. Emitter 62e is grounded and collector 62c is negatively biased through resistor 76. Collector 62c is connected in a feedback circuit to collector 60c through a capacitor 77 in series with a resistor 79 and a diode 80 connected in parallel.

Collector 62b is connected to base 63b of transistor 63 and its emitter 63e is negatively biased through 57. Collector 63c is negatively biased through resistor 81 to the negative supply 56. Collector 63c is connected through a coupling capacitor 82 to a midpoint 84 of resistors 85 and 86 respectively connected to the control electrodes or gates 14 and 15 of controlled rectifiers 11 and 12. A resistor 87 and a diode 88 are connected in parallel between the midpoint 84 and the tie between rectifiers 11 and 12.

Figure 2:
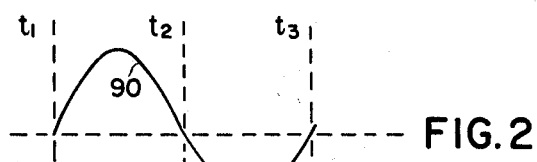
FIGURE 2 shows the waveform of the alternating current supply.
Figure 3:
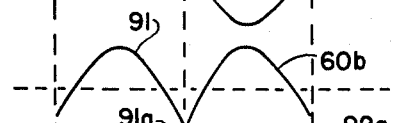
FIGURE 3 shows the waveform of the unfiltered direct current supply for the control unit.

In the operation of the power supply, alternating current from the source as shown in waveform 90 of FIGURE 2 is converted to rectified direct current delivered to the outputs 19–21. Full-wave rectified voltage as shown in wave-form 91 of FIGURE 3 is applied to the base of transistor 60 through the capacitor 64. After a transient condition, lasting for only a few cycles, a D.-C. biasing voltage substantially equal to the peak value of the rectified wave form is developed by a direct current charge on capacitor 64. This voltage is developed by emitter-to-base conduction of the transistor 60, which thereby functions as a shunt rectifier. This bias voltage can leak off slowly through the resistor 65. After the transient condition has passed, transistor 60 has emitter-to-base current flow only on the extreme negative tips 91a of the rectified wave form 91 of FIGURE 3. Emitter-to-base current flow occurs in transistor 60 at a time corresponding to a null or zero voltage point in the alternating current supply which was rectified to produce the indicated wave form.

Figure 4:
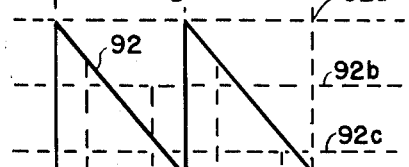
FIGURE 4 shows the waveform of the sawtooth voltage.

During the period when there is no emitter-to-base current flow in transistor 60, the capacitor 67 begins to charge in a negative direction through the resistor 66. During the instant when transistor 60 has emitter-to-base current flow, the collector-to-emitter circuit of the transistor becomes a very low resistance and hence the capacitor 67 is discharged. The charge portion of the cycle is characterized by a negative going voltage with essentially a linear characteristic and the discharge portion of the cycle is a very fast positive-going voltage, as shown by waveform 92 of FIGURE 4. By this means a sawtooth waveform is generated at the collector 60c of transistor 60 and the beginning of each linear rise on the sawtooth corresponds in time with a null point in the power supply frequency.

The sawtooth voltage swings from essentially ground potential 92a to a negative point that is determined by the time constant of the resistor 66 and the capacitor 67. This would be the situation in the absence of the connection to the base 61b of transistor 61. Practically, the negative going portion of the sawtooth is terminated by emitter-to-base conduction of transistor 61. Where this termination occurs is a function of the reference or sensing voltage on the emitter 61e. This emitter voltage is a potential derived from the power supply output through the voltage sensing or reference circuit including series connected diodes 69 and 70 so that its exact value is a function of the output voltage from the supply at any given instant and is indicated by dashed line 92b (heavy loading) and dashed line 92c (light loading) FIGURE 4.

The instant transistor 61 begins to conduct emitter-to-base current, its collector 61c begins to swing from the biasing potential of −20 in a positive direction due to emitter-to-collector current. This positive-going signal is applied through the capacitor 75 to the base 62b of transistor 62. Under quiescent conditions, transistor 62 is conducting and its base 62b is only a small fraction of a volt negative with respect to its emitter 62e. Hence, the positive-going voltage derived from the collector 61c of transistor 61 need go positive only a small fraction of a volt to drive the base 62b of transistor 62 positive with respect to its emitter 62e and hence to cut off emitter-to-collector current flow in transistor 62.

Figure 5:
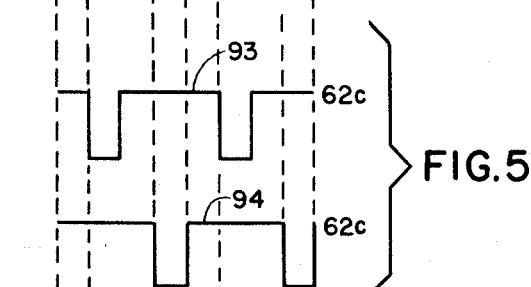
FIGURE 5 shows the waveforms of the output of the trigger for both heavy and light loads.

Cutoff of collector current in the transistor 62 allows its collector potential to start swinging in a negative direction from its normal resting potential, which is very nearly zero volts. The output waveform of collector 62 is shown in FIGURE 5, the waveform 93 being for heavy loads and the waveform 94 being for light loads.

The negative-going voltage at the collector 62c of transistor 62 performs two functions. It is fed back through the network composed of the capacitor 77, and the resistor 79, together with its shunting diode 80, to the base 61b of transistor 61. This negative going signal at the base 61b of transistor 61 drives it to still higher conduction and causes its collector 61c to swing positive even more rapidly. This is a regenerative action and serves to make the negative-going voltage at the collector 62c of transistor 62 a very fast changing potential.

The fast rising negative potential at the collector 62c of transistor 62 is applied to the base 63b of transistor 63, which is normally cut off by the −3 volt emitter potential and the fact that the collector 62c of transistor 62 is normally only a small fraction of a volt negative with respect to ground. The fast rising negative voltage on the base 63b of transistor 63 causes it to conduct when its base 63b becomes more negative than its emitter 63e. At this time emitter-to-collector conduction takes place in transistor 63 with the result that the collector 63c of transistor 63 swings rapidly in a positive direction from its quiescent resting point of −20 volts.

Figure 6:
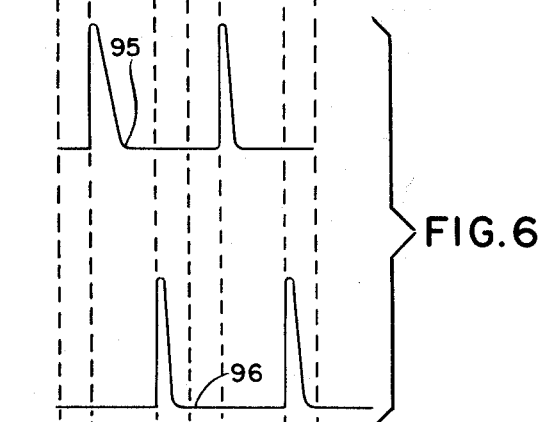
FIGURE 6 shows the waveforms of the amplifier output for both heavy and light loads.
Figure 7:
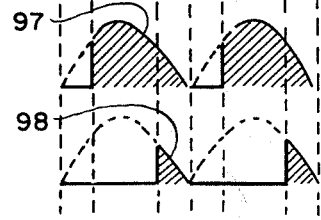
FIGURE 7 shows the waveforms of the rectified direct current for both heavy and light loads.

The output of transistor 63 after passing through coupling and differentiating capacitor 82 is shown in FIGURE 6 as waveforms 95 and 96 for heavy and light loads respectively. This rapid positive going signal from transistor 63 is applied to the starting electrodes of the silicon controlled rectifiers. The rectifier which is experiencing a forward voltage from the supply line at the instant the positive pulse arrives, begins conduction. The waveforms of the controlled rectifiers 11 and 12 are shown in FIGURE 7, waveform 97 being for heavy load and waveform 98 being for light load.

Referring back to transistor 61, the voltage at its emitter 61e is a function of the output voltage so that the point on the sawtooth voltage applied to its base where it begins conduction becomes a function of the output voltage from the supply. Polarities in the system are such that a positive change in the voltage at the emitter 61e corresponds to a decrease in the negative output voltage from the power supply.

A change in a positive direction at the emitter 61e results in the transistor 61 starting conduction earlier in the period of the sawtooth voltage wave and hence results in the application of a positive pulse to the silicon controlled rectifiers 11 and 12 earlier in the power supply cycle. This means that the silicon controlled rectifiers 11 and 12 will conduct for a larger fraction of the power supply cycle so as to increase the current flow to the load and hence to effect a correction for the decreasing output voltage. Correspondingly, a negative change in the voltage at the emitter 61e will result in later firing of the controlled rectifiers 11 and 12 and hence will result in a smaller angle of current flow therein, which will correct the rising negative voltage from the supply.

The diode 73 prevents the emitter 61e of transistor 61 from ever being driven positive with respect to ground. Such a situation could occur if there is a sudden change in a positive direction in the output voltage from the power supply. If the emitter 61e of transistor 61 were permitted to swing positive with respect to ground, transistor 61 would stay in a conducting condition and no output pulse would be obtainable to fire the controlled rectifiers 11 and 12. This would be the case because both transistors 61 and 62 must swing off and on alternately to produce control pulses for the controlled rectifiers. Without this protective feature a sudden drop in output voltage would result in cutting off all current flow through the controlled rectifiers 11 and 12 and hence the output voltage would collapse to zero.

The function of the capacitor 71 is to make information available to the emitter 61e of transistor 61 regarding changes in the output voltage even though zener diodes 69 and 70 are not conducting. This situation can occur during the start-up transient condition and can also occur in the event of sudden placement of a heavy load on the output of the supply.

The function of diode 88 which shunts the trigger circuit to the control electrodes 14 and 15 is to prevent the application of a negative pulse thereto.

The main power supply unit 1 and the control unit power supply 2 may be constructed of elements suitable for the desired loads. The controlled rectifiers 11 and 12 may be GE C35 or equivalent.

Representative values of the respective circuit elements of the control unit 3 which may be used are:

| | |
|---|---|
| Capacitor 64 | .1 mfd. |
| Resistor 65 | 820K. |
| Transistors 60, 61, 62 | RCA 2N398. |
| Transistor 63 | Tung-Sol 2N379. |
| Resistor 66 | 100K. |
| Capacitor 67 | .25 mfd. |
| Resistor 68 | 2.7. |
| Zener diodes 69, 70 | International rectifier IN1528. |
| Capacitor 71 | 12 mfd. |
| Resistor 72 | 470 ohms. |
| Zener diode 73 | GE IN70. |
| Resistor 74 | 15K. |
| Capacitor 75 | .03 mfd. |
| Resistor 76 | 1K. |
| Resistor 79 | 470K. |
| Diode 80 | GE IN70. |
| Resistor 81 | 1K. |
| Capacitor 82 | .1 mfd. |
| Resistor 85, 86 | 270 ohms. |
| Resistor 87 | 10K. |

While the invention has been described and illustrated with reference to a specific embodiment thereof, it will be understood that other embodiments may be resorted to without departing from the invention. Although p-n-p transistors have been described as being used in the circuitry, it obvious that n-p-n transistors might be used in which event the proper polarities of biasing voltages must be used. Likewise, equivalent circuitry changes might be made. Therefore, the form of the invention set out above should be considered as illustrative and not as limiting the scope of the following claims.

We claim:

1. An electrical system including a controlled rectifier, a control electrode for the controlled rectifier, a load circuit, a source of alternating current connected in series with the rectifier and the load circuit, means providing a voltage reference, means for comparing the load voltage with the voltage reference for establishing a control potential responsive to the load voltage, a source of timing pulses synchronized with the alternating current source, first and second transistors each having an emitter, a base, and a collector, the source of timing pulses coupled to the base of the first transistor, a capacitor connected between the first emitter and the first collector, means providing a charging potential for the capacitor so that a sawtooth pulse voltage is produced across the capacitor responsive to said timing pulses, the capacitor connected to the base of the second transistor, bias means for the collector of the second transistor, means coupling the collector of the second transistor to the control electrode of the controlled rectifier, and means coupling said control potential to the emitter of the second transistor so that the control potential is compared with said sawtooth pulse voltage to produce a control pulse of a desired phase relationship with respect to the voltage of the alternating current source, whereby the load voltage is maintained substantially constant.

2. An electrical system including a controlled rectifier, a control electrode for the controlled rectifier, a load circuit, a source of alternating current connected in series with the rectifier and the load circuit, means providing a voltage reference, means for comparing the load voltage with the voltage reference for establishing a control potential responsive to the load voltage, a source of timing pulses synchronized with the alternating current source, first and second transistors each having an emitter, a base, and a collector, the source of timing pulses coupled to the base of the first transistor, a capacitor connected between the first emitter and the first collector, means providing a charging potential for the capacitor so that a sawtooth pulse voltage is produced across the capacitor responsive to said timing pulses, the sawtooth generating capacitor connected to the base of the second transistor, bias means for the collector of the second transistor, means coupling the collector of the second transistor to the control electrode of the controlled rectifier, means coupling said control potential to the emitter of the second transistor, and means for applying a start-up bias to the emitter of the second transistor in the event said load voltage is below a predetermined value, whereby the load voltage is maintained substantially constant.

3. An electrical system including a controlled rectifier, a control electrode for the controlled rectifier, a load circuit, a source of alternating current connected in series with the rectifier and the load circuit, at least one zener diode providing a voltage reference, a first capacitor in parallel with the zener diode for establishing a control potential responsive to the load voltage, a source of timing pulses synchronized with the alternating current source, first and second transistors each having an emitter, a base, and a collector, the source of timing pulses coupled to the base of the first transistor, a second capacitor connected between the first emitter and the first collector, means providing a charging potential for the second capacitor so that a sawtooth pulse voltage is produced across the second capacitor responsive to said timing pulses, the second capacitor connected to the base of the second transistor, bias means for the collector of the second transistor, means coupling the collector of the second transistor to the control electrode of the controlled rectifier, means cupling said parallel connected first capacitor and zener diode for establishing said control potential to the emitter of the second transistor, and means for applying a start-up bias to the emitter of said second transistor in the event said load voltage is below a predetermined value, whereby the load voltage is maintained substantially constant.

References Cited by the Examiner

UNITED STATES PATENTS

| | | | |
|---|---|---|---|
| 2,467,765 | 4/49 | Mayle | 315—205 X |
| 2,530,169 | 11/50 | Lawrence | 315—205 X |
| 2,977,523 | 3/61 | Cockrell | 323—22 |
| 3,116,446 | 12/63 | Healey | 321—18 |
| 3,124,738 | 3/64 | Smith et al. | |

LLOYD McCOLLUM, *Primary Examiner.*

ROY H. NEILSON, *Examiner.*